US010920351B2

(12) United States Patent
Daniels

(10) Patent No.: US 10,920,351 B2
(45) Date of Patent: Feb. 16, 2021

(54) SEWING METHOD AND APPARATUS TO INCREASE 3D OBJECT STRENGTH

(71) Applicant: Xerox Corporation, Norwalk, CT (US)

(72) Inventor: Marc D. Daniels, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 122 days.

(21) Appl. No.: 16/369,934

(22) Filed: Mar. 29, 2019

(65) Prior Publication Data

US 2020/0308744 A1 Oct. 1, 2020

(51) Int. Cl.
*D05B 19/02* (2006.01)
*D05B 19/00* (2006.01)
(Continued)

(52) U.S. Cl.
CPC ............ *D05B 19/02* (2013.01); *B29C 64/147* (2017.08); *B29C 64/205* (2017.08); *B29C 64/393* (2017.08); *D05B 19/006* (2013.01); *B29C 64/194* (2017.08); *B29C 64/379* (2017.08); *B29C 65/18* (2013.01); *B29C 65/62* (2013.01);
(Continued)

(58) Field of Classification Search
CPC ......... B33Y 10/00; B33Y 30/00; B33Y 40/00; B33Y 40/20; B29C 64/00; B29C 64/10; B29C 64/141; B29C 64/147; B29C 64/153; B29C 64/188; B29C 64/194; B29C 64/20; B29C 64/205; B29C 64/30; B29C 64/379; B29C 64/393; B29C 65/00; B29C 65/02; B29C 65/18; B29C 65/62; B29C 65/72;
(Continued)

(56) References Cited

U.S. PATENT DOCUMENTS 3,473,205 A 10/1969 Zocher
3,774,273 A 11/1973 Okamoto et al.
(Continued)

FOREIGN PATENT DOCUMENTS

EP 2776233 12/2017
WO WO2014134224 9/2014

OTHER PUBLICATIONS

Wikipedia (2018). Augmented Reality. Wikipedia, the free encyclopedia. Dec. 6, 2018 from https://en.wikipedia.org/wiki/Augmented_reality.
(Continued)

*Primary Examiner* — Philip C Tucker
*Assistant Examiner* — Brian R Slawski
(74) *Attorney, Agent, or Firm* — Caesar Rivise, PC

(57) ABSTRACT

An addition to additive manufacturing sews a number of printed substrate sheets together using industrial sewing machine technology. Portions of the final 3D object that will be solid are sewn together into bundles of the object with a needle protruding through the top of the bundle via a sewing machine with a looping mechanism connecting the thread loops under each bundle of printed substrate sheet layers. This will result in many well connected stack bundles that are then stacked in alignment to form the final stack. During heat and compression, the stitch thread may bunch together and become entangled with the cooled plastic of the final solid 3D object. Removal of the excess substrate may proceed as usual, since the sewing is applied only in the solid portions of the final object. The end result will be a part with much higher strength in the Z axis.

11 Claims, 4 Drawing Sheets

(51) Int. Cl.
    *B29C 64/205*     (2017.01)
    *B29C 64/393*     (2017.01)
    *B29C 64/147*     (2017.01)
    *B29C 65/72*     (2006.01)
    *B29C 65/18*     (2006.01)
    *B29C 64/194*     (2017.01)
    *B29C 65/62*     (2006.01)
    *B33Y 10/00*     (2015.01)
    *B33Y 30/00*     (2015.01)
    *B29C 64/379*     (2017.01)
    *B33Y 40/20*     (2020.01)

(52) U.S. Cl.
    CPC ............ *B29C 65/72* (2013.01); *B33Y 10/00* (2014.12); *B33Y 30/00* (2014.12); *B33Y 40/20* (2020.01); *D10B 2101/12* (2013.01)

(58) Field of Classification Search
    CPC ... D05B 19/006; D05B 19/02; D10B 2101/12
    USPC .......... 156/60, 62.2, 63, 65, 91, 92, 93, 182,
        156/242, 246, 250, 256, 264, 269, 270,
        156/277, 308.2, 309.6, 349, 350, 367,
        156/384, 423, 500, 501, 510, 512, 516,
        156/517, 538, 539, 556, 558, 559, 563,
        156/566, 568, 580, 583.1
    See application file for complete search history.

(56) References Cited

U.S. PATENT DOCUMENTS

| | | | |
|---|---|---|---|
| 5,173,733 A | 12/1992 | Green | |
| 5,591,933 A * | 1/1997 | Li | F41H 5/0485 |
| | | | 156/93 |
| 5,943,125 A | 8/1999 | King et al. | |
| 6,377,758 B1 | 4/2002 | OuYang et al. | |
| 7,050,078 B2 | 5/2006 | Dempski | |
| 7,324,081 B2 | 1/2008 | Friedrich et al. | |
| 7,463,149 B2 | 12/2008 | Friedrich et al. | |
| 8,116,585 B2 | 2/2012 | Wu et al. | |
| 8,496,370 B2 | 7/2013 | Hsu | |
| 8,756,894 B2 | 6/2014 | Swartz et al. | |
| 8,786,686 B1 | 7/2014 | Amirparviz | |
| 9,266,287 B2 | 2/2016 | Kautz et al. | |
| 9,393,770 B2 | 7/2016 | Swartz et al. | |
| 9,507,788 B2 | 11/2016 | Pavlov et al. | |
| 9,683,950 B2 | 6/2017 | Sarrazin et al. | |
| 9,740,974 B2 | 8/2017 | Kumar et al. | |
| 9,776,376 B2 | 10/2017 | Swartz et al. | |
| 9,827,754 B2 | 11/2017 | Swartz et al. | |
| 9,833,949 B2 | 12/2017 | Swartz et al. | |
| 10,046,552 B2 | 8/2018 | Swartz et al. | |
| 2002/0133264 A1 | 9/2002 | Maiteh et al. | |
| 2006/0255525 A1 | 11/2006 | Dinatale et al. | |
| 2013/0171431 A1 | 7/2013 | Swartz et al. | |
| 2014/0085620 A1 | 3/2014 | Lobovsky et al. | |
| 2014/0238173 A1 | 8/2014 | Swartz et al. | |
| 2014/0257549 A1 | 9/2014 | Swartz et al. | |
| 2015/0034123 A1 | 2/2015 | Pressacco et al. | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0260261 A1 | 9/2016 | Hsu | |
| 2016/0297142 A1 | 10/2016 | Bheda et al. | |
| 2016/0339645 A1 | 11/2016 | Swartz et al. | |
| 2017/0106586 A1 | 4/2017 | Keoshkerian et al. | |
| 2017/0144426 A1 | 5/2017 | Moore et al. | |
| 2017/0151719 A1 | 6/2017 | Swartz et al. | |
| 2017/0173868 A1* | 6/2017 | Mark | B29C 64/106 |
| 2017/0291223 A1 | 10/2017 | Swartz et al. | |
| 2017/0297303 A1 | 10/2017 | Swartz | |
| 2017/0368744 A1 | 12/2017 | Zona et al. | |
| 2018/0008141 A1 | 1/2018 | Krueger | |
| 2018/0022065 A1 | 1/2018 | Swartz et al. | |
| 2018/0072001 A1 | 3/2018 | Swartz et al. | |
| 2018/0141305 A9 | 5/2018 | Swartz et al. | |
| 2018/0264725 A1 | 9/2018 | Swartz et al. | |
| 2018/0264732 A1 | 9/2018 | Swartz et al. | |
| 2019/0067077 A1 | 2/2019 | Muramoto | |

OTHER PUBLICATIONS

Impossible Objects' CBAM Pilot Project (video), https://www.youtube.com/watch?v=Dn37IXU2K0M, retrieved Dec. 12, 2018.

\* cited by examiner

SEWING METHOD AND APPARATUS TO INCREASE 3D OBJECT STRENGTH

FIELD OF DISCLOSURE

This disclosure relates generally to systems and methods for composite-based additive manufacturing, and more particularly, to such process that render individual laminate layers to be built up to form and/or manufacture three-dimensional objects, parts and components (3D objects).

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

Some 3D printers use a process of printing plastic in the image of the part cross section onto a fibrinous sheet, such as carbon fiber, and then stacking many sheets to form a stack that will become a 3D object after the stack is heated to melt or cure the plastic and the stack compressed. Excess non-bonded fibrous sheet material is removed via sand blasting or other methods. 3D object strength is dominated by the fiber strength in the X and Y axis. Layer to layer strength (Z axis) is dominated by the plastic binder strength. The weakest aspect of the final 3D object is in the Z axis, where the part is only as strong as the polymer adhesion between layers. It would be beneficial to increase layer to layer strength of the 3D object.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a method of bonding printed composite layers into bundles during composite based additive manufacturing. The method may include receiving a plurality of printed substrate layers in succession from an additive manufacturing device, each printed substrate layer having a substrate sheet printed with a polymer, stacking the received plurality of printed substrate layers in aligned formation at a piling station to form a bundle of the printed substrate layers, the bundle of printed substrate layers being a part of a stack of the printed substrate sheets forming a 3D composite object, transferring the bundle of printed substrate layers to a sewing machine with a bundle convey subsystem, sewing the printed substrate layers together with the sewing machine to form a sewn bundle, and transferring the sewn bundle to a stacker subsystem by the bundle convey subsystem for subsequent bonding with a second sewn bundle to form a stack of printed substrate layers including the sewn bundle. In examples, the method may also include sewing the printed substrate layers together with the sewing machine by repeatedly passing a sewing needle and sewing thread attached to the sewing needle through the bundle of printed substrate layers to pull a first loop of the sewing thread from one side of the bundle to the opposite side of the bundle with a sewing mechanism, repeatedly wrapping the first loop of the sewing thread around a second loop of the sewing thread with a looping mechanism, and pulling the sewing needle and attached sewing thread out of the bundle of printed substrate layers. In examples, the method may further include outputting control signals from a controller to control a sewing machine.

According to aspects illustrated herein, an apparatus for bonding printed composite layers into bundles during composite based additive manufacturing may include a sewing subsystem having a bundle convey subsystem and a sewing machine proximate the bundle convey system. The bundle convey subsystem has a piling station configured to receive and stack a plurality of printed substrate layers in succession from an additive manufacturing device in aligned formation as a bundle of the printed substrate layers, where each printed substrate layer has a substrate sheet printed with a polymer. The bundle of printed substrate layers is a part of a stack of the printed substrate sheets forming a 3D composite object. The bundle convey subsystem is configured to transfer the bundle of printed substrate layers to the sewing machine. The sewing machine is configured to sew the printed substrate layers together as a sewn bundle. After the bundle is stitched together by the sewing machine, the bundle convey subsystem may transfer the sewn bundle to a stacker subsystem for subsequent bonding of the sewn bundle with other sewn bundles to form a stack of printed substrate layers including the sewn bundle.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
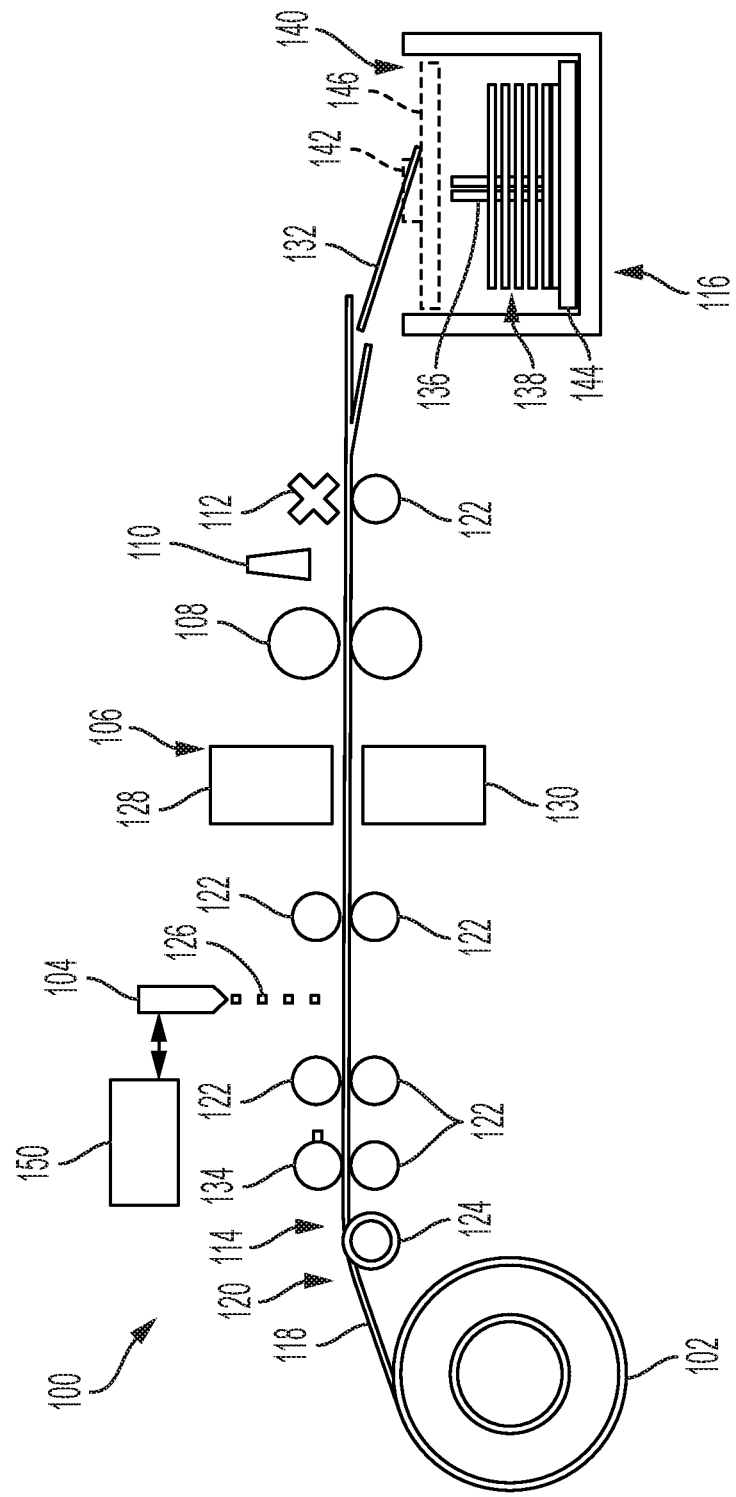
FIG. 1 is a side view of an additive manufacturing system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term 'image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

FIG. 1 is a block diagram of an exemplary AM system 100 for printing 3D objects. The AM system 100 may include components such as a material feeder 102, an image-forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. In the AM system 100, marking material 148 (e.g., powder) (FIG. 4) is selectively deposited by powder subsystem 106 in a physical pattern on a substrate material 118 (or substrate sheets thereof) that corresponds to a "positive image' of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image-forming device 104. The substrate material 118 may be transferred to the image-forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image-forming device 104, the powder subsystem 106, the fuser 108, the sensor 110, and then be cut by the cutter 112 into single sheets prior to stacking, as discussed in greater detail below.

The image-forming device 104 may then deposit a pattern of an adhering agent (e.g., fluid 126) in image-wise fashion at precise locations onto the substrate material 118. The fluid 126 is selectively deposited on the substrate material 118 so that some parts of the material are covered with liquid as a positive image of a slice of a 3d object, and some parts of the material are not. The pattern of fluid 126 may be deposited via a variety of approaches. For example, the image-forming device 104 may include a thermal inkjet head or a piezoelectric inkjet head to dispense the fluid. In examples, the image-forming device 104 may apply air pressure to dispense the fluid 126. The image-forming device 104 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image-forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the substrate material or sheet thereof, but does not adhere to portions of the substrate that are not covered with the fluid.

In typical application, the powder applicator 128 may include a trough containing the powder. The trough may have a slitted opening on its underside and is connected to an electromechanical vibrator of the powder subsystem. The vibrator, when active, causes the powder to flow downward through the slitted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite or ferric oxide (FeO), may be used for the toner powder in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer.

Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder system 106 can be set to run continuously so that, once the substrate material 118 passes the image forming device 104, the substrate automatically travels through the powder system 106. Alternatively, the controller 150 in communication with the transfer subsystem 114, the image forming device and the powder system 106 can instruct the powder applicator 128 and powder remover 130 or subsystems thereof to turn on and off at the appropriate times.

After the substrate 118 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 108 may be disposed after the powder system 106. The fuser 108 may be disposed above, below, or adjacent to the substrate leading out of the powder remover 130. The fuser 108 may be, for example but not limited to, radiant, IR, or other heating approach sufficient to melt and thereby fix the patterned powder to the substrate. As the substrate 118 travels out of the powder system 106, the heat from the fuser 108 melts the powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate material is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the roll 102 of substrate material 118 is mounted and situated ahead of the image-forming device 104. While not being limited to a particular theory, the web of substrate material 118 can extend through all of the components of the AM system, including the image-forming device 104, the powder subsystem 106, the fuser 108, the sensor 110, and then be cut by the cutter 112 into single sheets 132 prior to stacking, with the sheets corresponding to a layer of a 3D object. In examples, the web of substrate material 118 may be cut by the cutter 112 into single sheets 132 at any prior point in the process. For example, the web may be converted to a single sheet prior to advancing the resulting substrate sheet to the image-forming device 104. Likewise, the web may be converted to a single sheet after the image-forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image-forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

In order to complete the AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image-forming device 104, powder subsystem 106, fuser 108, sensor 110, cutter 112, transfer subsystem 114, punching device 134 and stacker subsystem 116 may operate as discussed herein based on input from the controllers. Thus while the controller 150 is shown in communication with the image-forming device 104, it is understood that the controller may be in communication with any component of the AM system.

Figure 2:
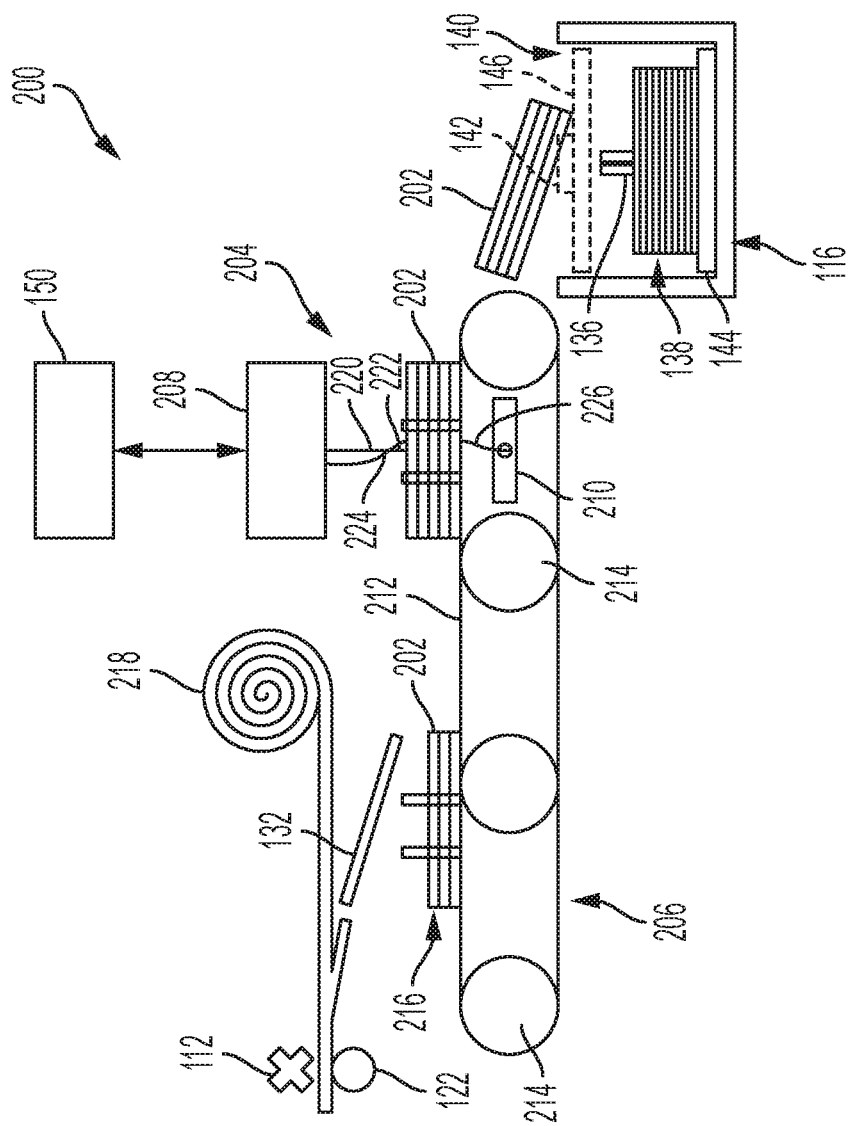
FIG. 2 is a side view of an exemplary sewing subsystem usable within additive manufacturing systems.

FIG. 2 depicts an exemplary sewing subsystem 200 that may operate with the AM system 100. The sewing subsystem 200 is configured to stitch printed composite layers together into bundles of the printed composite sheet layers. While not being limited to a particular theory, the sewing subsystem 200 may be operable as an intermediate part of a composite based additive manufacturing to increase layer to layer strength of a 3D object. As used herein, the term "sewing" shall include any association or attachment of layers with a thread or filament, regardless of any mechanism (e.g., reciprocating needle, etc.) for applying the thread or filament to the layers.

In particular, the sewing subsystem 200 may bond together layers of printed substrate sheets 132, for example by stitching the sheets together into a bundle 202 of the layers. Bundles 202 of the printed layers may then be stacked, for example by the stacker subsystem 116 into a stack 138 of the printed sheets. Toward that end, the sewing subsystem 200 may include a sewing machine 204 and a bundle convey subsystem 206. The sewing machine 204 may be an integrated unit having a sewing mechanism 208 and a looping mechanism 210, as will be described in greater detail below.

The bundle convey subsystem 206 may transfer printed sheets 132 as bundles 202 through the sewing subsystem 200 to a stacker subsystem 116. For example, the bundle convey subsystem 206 depicted in FIG. 2 may be structured and operable to collect cut printed substrate sheets 132 as printed layers, organize the collected printed layers into bundles 202, transfer the bundles to the sewing machine 204 for sewing printed layers of the bundle together, and then transfer the sewn bundles to the stacker subsystem to form a stack 138 of a 3D object. As such, the bundle convey subsystem 206 may include a belt 212, feed rollers 214 and registration pins 136 used to hold and advance bundles 202 through the AM system 100. The bundle convey subsystem 206 further includes a piling station 216 that may be positioned proximate to the transfer subsystem 114 to receive and align a number of cut printed substrate sheets 132 from the transfer subsystem. The piling station 216 may stack the number of cut printed substrate sheets 132 in register, for example, based on the aforementioned registration apertures. As can be seen in FIG. 2, the piling station 212 receives a number of the printed substrate sheets 132 in succession with registration apertures aligned about registration pins 136 of the bundle convey subsystem to form a bundle 202 of the printed layers.

The bundle 202 is understood to be a plurality of cut printed substrate sheets 132, also referred to as layers. A bundle 202 of sheet layers may include any number of sheet layers that may be sewn together by the sewing machine 204. The number of sheet layers making up a bundle may depend on the thickness of the substrate material 118 and the thickness of the printed patterned on the substrate sheets. The examples are not limited to any particular number of printed sheet layers, as long as the sewing machine 204 can stitch the layers together. For example, the number of sheet layers may be between 2 and 100, or between 2 and 50, or between 2 and 25, or between 2 and 10. Further each bundle may vary in thickness (e.g., approximately 0.5-3 mm of stack thickness increase, 1-10 MM of stack thickness increase, 1-25 mm of stack thickness). For efficiencies, the number of layers may be in the range of printed sheet layers that may be sewn together without causing over burden or stress to the components of the sewing machine.

While not being limited to a particular theory, the bundle convey subsystem 206 may be part of the transfer subsystem 114 or separate from the transfer subsystem. Still referring to FIG. 2, the bundle convey subsystem 206 may be separate from and proximate a web based transfer subsystem 114 located downstream the cutter 112. The substrate material 118 may be a web substrate where printed substrate sheets 132 are cut by the cutter 112 and stacked into bundles 202, while portions of the web substrate not separated by the cutter may subsequently be rerolled at 218. The bundles 202 may then be stitched together by the sewing machine 204 and transferred to the stacker subsystem 116 to stack the sewn bundles and for subsequent processing (e.g., heating, compression, cleaning).

The sewing machine 204 is located proximate the bundle convey subsystem 206 and is configured to sew a bundle 202 of printed substrate layers together as a sewn bundle. As noted above, the sewing machine 204 may be an integrated unit having a sewing mechanism 208 located above bundles 202 coming from the piling station 216 via the bundle convey subsystem 206, and a looping mechanism 210 located under the bundles. The sewing mechanism 208 includes a sewing needle 220 having thread aperture 222 near a piercing tip thereof. As can be seen in FIG. 2, the sewing mechanism 208 may store sewing thread 224, which extends through the thread aperture 222 of the sewing needle. The sewing mechanism 208 may include a needle bar (not shown) that connects the sewing needle 220 to sewing mechanism components (e.g., gears, cams, cranks, belts) that may be driven by a motor to reciprocate the sewing needle downwards and upwards to repeatedly pull the sewing thread 224 through the bundle 202 of printed substrate layers and back out to stitch the substrate layers together. The looping mechanism 210 is located under the bundle 202 being sewn, opposite the sewing mechanism.

While not being limited to a particular theory, the looping mechanism may interact with the sewing thread 224 that has passed through the bundle to the underside thereof to complete a loop stitch with the thread, as is readily understood by a skilled artisan. For example, the looping mechanism 210 may loop a single length of the sewing thread 224 underneath a bundle back on itself to form a chain stitch. In this example, the looping mechanism 210 may include a looping hook (not shown) that moves in synch with the reciprocating sewing needle 220 to grab a loop of sewing thread pulled under the bundle before the sewing needle pulls out of the bundle, and then pushes the loop forwards. The sewing needle 220 pushes through the bundle again, which pulls the sewing thread back under the bundle as a new loop of thread. This new loop of sewing thread passes through the middle of the prior loop. The looping hook grabs the thread again and pushes the loop forwards for the next stitch. In this way, every loop of thread holds the next loop in place.

In another example, the looping mechanism 210 may repeatedly wrap the first loop of the sewing thread 224 around a second sewing thread to form a lock stitch, as well understood to a skilled artisan. Like the example discussed above, the sewing needle 220 pushes through the printed layers of the bundle 202 and leaves a loop of the sewing thread 224. However, in this example, the sewing mechanism 208 joins the loop to the second thread that unspools from the looping mechanism. In this example, the looping mechanism may include a shuttle hook and bobbin assembly. When the sewing needle 220 pushes a loop through the second thread, the rotary shuttle grips the loop with its hook. As the shuttle rotates, it pulls the loop of sewing thread 224 around the second thread coming from the bobbin. In the examples, the sewing thread 224 may be include a polymer fiber, a carbon fiber, a combination thereof, or any material (e.g., cotton, rayon, etc.) usable to stitch the bundles together, as well understood by a skilled artisan.

After a bundle 202 is sewn together by the sewing machine 204, the bundle convey subsystem may transfer the sewn bundle to the stacker subsystem 216 for subsequent bonding of the sewn bundle with other sewn bundles placed onto the stacker subsystem. The subsequent bonding may be provided by heating and compressing the stack of bundles 202 to form a bonded stack of the sewn bundles. During the heating and compression of the bundles 202, the sewing threads of each bundle will bunch together within each bundle and with adjacent bundles. As the substrate layers are allowed to cool, the threads become fixedly entangled with the cooled polymers of the substrate layers of the bundle and adjacent bundles forming the final solid 3D object. Removal of the excess substrate, that is, the substrate material of the layers that are not printed with the patterned polymers, may proceed as discussed above without concern of exposing the entangled threads, as the threads are originally sewn only in the printed areas of the printed substrate sheets. The end result is a final solid 3D object with an increased strength in the Z-axis perpendicular to the planar direction of the stacked substrate sheets due to the sewing and entanglement of the sewing thread throughout the 3D object.

While not being limited to a particular theory, the sewing machine 204 may be configured to sew together layers of printed substrate sheets into bundles 202 only between printed portions of the printed sheets 132. With this approach, the sewing threads are disposed only within printed areas of the printed sheets to stitch together the 3D object, and not excess substrate that has not been covered by the print material. The controller 150 may communicate with the sewing subsystem 200 to direct the sewing machine 204 to stitch together only printed areas of the sheet layers based on factors such as the shape of the 3d object being formed and the sectioned bundle of the 3D object being sewn together. The sewing machine 204 may be an electric sewing machine offering various stitches, such as a zig-zag stitch, where the sewing needle 220 is moved by components of the sewing mechanism 208 from side to side at the same time that the needle is moving up and down. The sewing machine may be controlled by the controller 150 to control the sewing machine motor(s), which precisely move the sewing needle 220 and other components of the sewing machine 204 to produce stitching in a pattern that matches the printed image pattern on the substrate sheet layers of the bundle.

Figure 3:
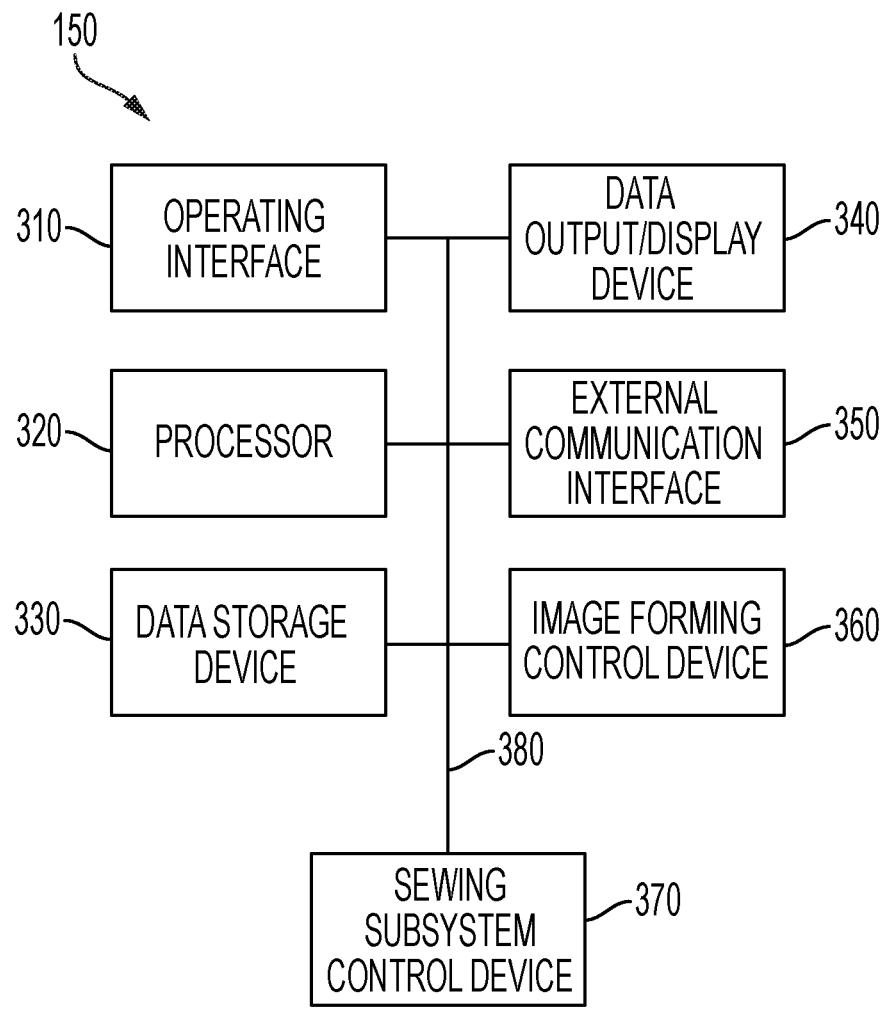
FIG. 3 illustrates a block diagram of an exemplary control system for implementing a composite based additive manufacturing sewing scheme.

FIG. 3 illustrates a block diagram of the controller 150 for executing instructions to automatically control exemplary devices in the AM system 100 and sewing subsystem 200 illustrated in FIGS. 1 and 2. The exemplary controller 150 may provide input, to or be a component of a controller for executing the AM 3D object forming process in a system such as that depicted in FIGS. 1-2 and described in greater detail below in FIG. 4.

The exemplary control system 150 may include an operating interface 310 by which a user may communicate with the exemplary control system 150. The operating interface 310 may be a locally-accessible user interface associated with the AM 3D object forming system 100. The operating interface 310 may be configured as one or more conventional mechanism common to control devices and/or computing devices that may permit a user to input information to the exemplary control system 150. The operating interface 310 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 310 may be a part or a function of a graphical user interface (GUI) mounted on, integral to, or associated with, the AM system 100 and sewing subsystem 200 with which the exemplary control system 150 is associated.

The exemplary control system 150 may include one or more local processors 320 for individually operating the exemplary control system 150 and for carrying into effect control and operating functions for AM 3D object forming, and specifically for implementing composite-based layer forming schemes, and sewing layers of printed sheets into binders that are stacked into a 3d object. Processor(s) 320 may include at least one conventional processor or microprocessor that interpret and execute instructions to direct specific functioning of the exemplary control system 150, and control of the AM 3D object forming process and/or the bundle sewing with the exemplary control system 150.

The exemplary control system 150 may include one or more data storage devices 330. Such data storage device(s) 330 may be used to store data or operating programs to be used by the exemplary control system 150, and specifically the processor(s) 320. Data storage device(s) 330 may be used to store information regarding, for example, one or more 3D object models for producing 3D objects in an AM system with which the exemplary control system 150 is associated. Stored 3D object model information may be devolved into data for the printing of a series of layers of 2D slices and sewing printed substrate layers for forming the 3D object in the manner generally described by example herein.

The data storage device(s) 330 may include a random access memory (RAM) or another type of dynamic storage device that is capable of storing updatable database information, and for separately storing instructions for execution of AM system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 150, or may be provided external to, and in wired or wireless communication with, the exemplary control system 150, including as cloud-based data storage components.

The exemplary control system 150 may include at least one data output/display device 340, which may be configured as one or more conventional mechanism that output information to a user, including, but not limited to, a display screen on a GUI of the AM system 100 and/or the sewing subsystem 200 with which the exemplary control system 150 may be associated. The data output/display device 340 may be used to indicate to a user a status of a 3D object forming operation effected by the AM system/sewing subsystem with which the exemplary control system 150 may be associated including an operation of one or more individually controlled components at one or more of a plurality of separate processing stations or subsystems in the device.

The exemplary control system 150 may include one or more separate external communication interfaces 350 by which the exemplary control system 150 may communicate with components that may be external to the exemplary control system such as the printed sheet fiber entanglement apparatus 200. At least one of the external communication interfaces 350 may be configured as an input port to support connecting an external CAD/CAM device storing modeling information for execution of the control functions in the 3D object forming operations. Any suitable data connection to provide wired or wireless communication between the exemplary control system 150 and external and/or associated components is contemplated to be encompassed by the depicted external communication interface 350.

The exemplary control system 150 may include an image forming control device 360 that may be used to control the image forming process on the substrate material 118 (e.g., image forming device 104, powder subsystem 106, fuser 108) which produces the series of 2D slices (e.g., printed substrate sheets 132) for the in-process 3D object according to devolved 3D object modeling information. The substrate material 118 may be fed through the image forming device 104, powder subsystem 106 and fuser 108 to have marking material images formed thereon under the control of the image forming control device 360. The substrate material may exit the powder subsystem 106 as a printed substrate web and be cut and automatically stacked at an output side of the AM system 100 via the sewing subsystem 200 in order to constitute a stack of the printed sheets 138 having sewn bundles for forming an object. The image forming control device 360 may operate as a part or a function of the processor 320 coupled to one or more of the data storage devices 330, or may operate as a separate stand-alone component module or circuit in the exemplary control system 150. Either of the processor 320 or the image forming control device 360 may parse the input 3D object model information to determine and execute a layer-by-layer 2D slice material layer printing scheme on the substrate material 118 in the AM system 100.

The exemplary control system 150 may include a sewing subsystem control device 370 coupled to one or more of the data storage devices 330, or as a separate stand-alone component module or station in the exemplary control system 150. The sewing subsystem control device 370 may be usable to control the functioning of one or more of a printed sheet bundle stacking and bundle sewing process to stitch individual printed sheets to one another and form a sewn bundle of the printed sheets for stacking and processing into a final 3D object. In such instances, the sewing subsystem 200 may be used to stack the printed substrate sheets in precise alignment as batches, stitch the batches together and forward the sewn batches for stacking in precise alignment as a stack of the batches for later use. Heating and further pressing the stack 138 may be provided subsequently off line as needed to not slow down the batch sewing process. The sewing subsystem control device 370 may operate as a part or a function of the processor 320 coupled to, for example, one or more data storage devices 330, or as one or more separate stand-alone component modules or circuits in the exemplary control system 150.

The exemplary control system 150 may include a 3D object finisher control device (not shown) for executing a final 3D object shaping scheme on a processed stack of sewn printed sheet layered batches in a subtractive machining process that may remove the layered support component structure and surface finish the 3D object. As with the above-enumerated other separate control devices, the 3D object finisher control device may operate as a part or a function of the processor 320 coupled to one or more data storage devices 330 for executing finishing device operations, or may operate as a separate stand-alone component module or circuit in the exemplary control system 150.

All of the various components of the exemplary control system 150, as depicted in FIG. 3, may be connected internally, and to one or more AM object forming devices and/or components thereof, by one or more data/control busses 380. These data/control busses 380 may provide wired or wireless communication between the various components of the exemplary control system 150, whether all of those components are housed integrally in, or are otherwise external and connected to an AM system 100 with which the exemplary control system 150 may be associated.

It should be appreciated that, although depicted in FIG. 3 as an integral unit, the various disclosed elements of the exemplary control system 150 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 3. Further, although depicted as individual units for ease of understanding of the details provided in this disclosure regarding the exemplary control system 150, it should be understood that the described functions of any of the individually-depicted components, and particularly each of the depicted control devices, may be undertaken, for example, by one or more processors 320 connected to, and in communication with, one or more data storage device(s) 330.

Figure 4:
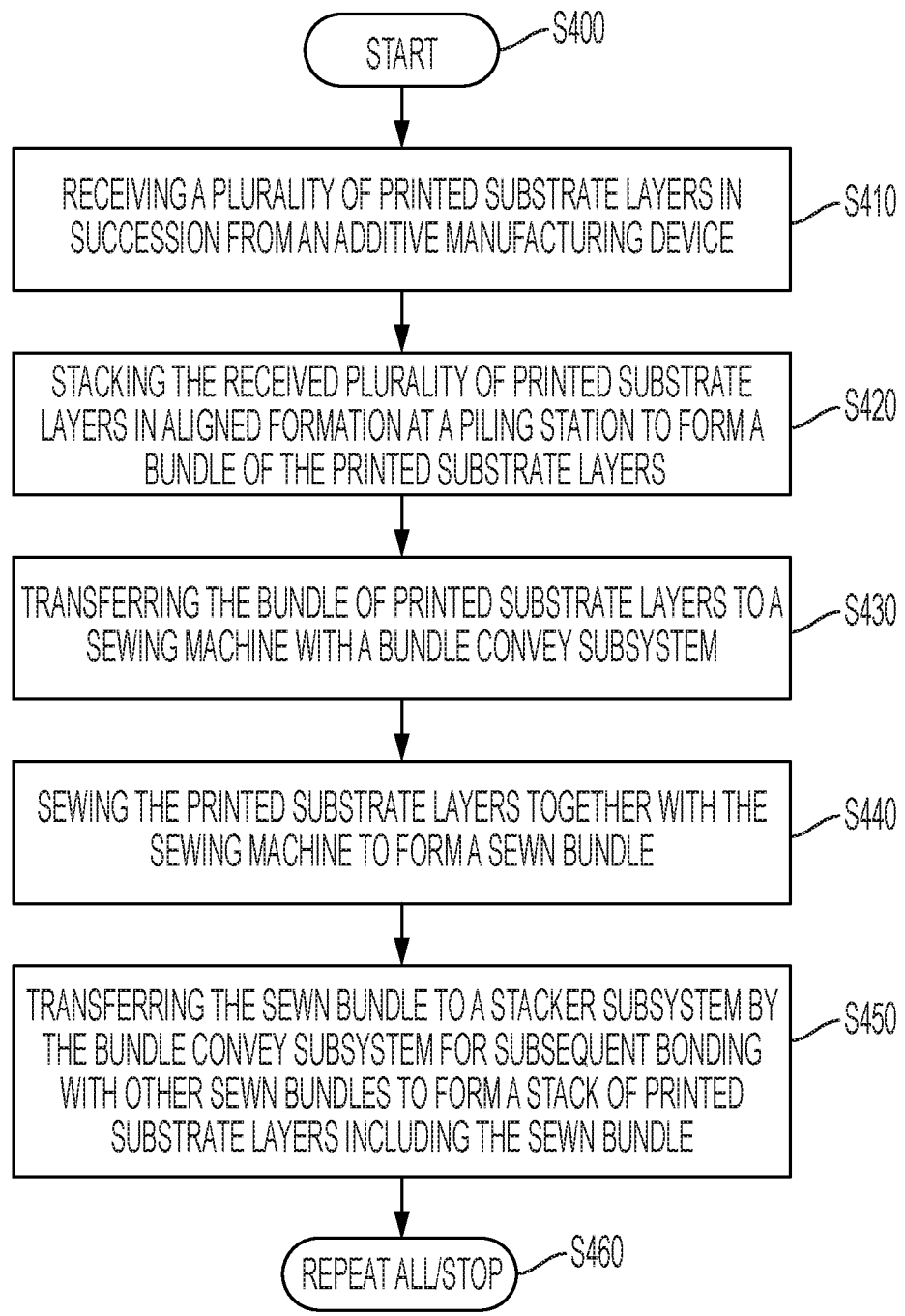
FIG. 4 is a flowchart depicting the operation of an exemplary method for sewing printed sheets to bond a stack of the printed sheets.

The disclosed embodiments may include an exemplary method for increasing the strength of a 3D object in the Z-axis direction perpendicular to the printed substrate sheet layers thereof by sewing batches of the printed substrate sheet layers and forwarding the sewn batches to form a stack of the batches as the 3D object. FIG. 4 illustrates a flowchart of such an exemplary method of bonding printed composite layers into bundles during composite based additive manufacturing, which commences at Step S400 and proceeds to Step S410.

At Step S410, cut printed sheets 132 are received as 2D layers in succession from an AM system at a piling station of a bundle convey subsystem. Operation of the method proceeds to Step S420, where the received plurality of printed substrate layers are stacked in aligned formation at the piling station to form the bundle of aligned printed substrate layers. This step may include aligning registration apertures of the printed substrate layers about registration pins at the piling station to align the printed substrate layers of the bundle. Each bundle of sheet layers may include any number of sheet layers that may be sewn together by the sewing machine 204. The number of sheet layers making up a bundle may be predetermined based on the thickness of the substrate material and the thickness of the printed patterned on the substrate sheets. The examples are not limited to any particular number of printed sheet layers, as long as the sewing machine 204 can stitch the layers together. Operation of the method proceeds to Step S430.

At Step S430, the bundle convey subsystem transfers the bundle of printed substrate layers to a sewing machine. Operation of the method proceeds to Step S440, where the printed substrate layers of the bundle are sewn together with the sewing machine to form a sewn bundle. In examples, a controller may communicate with the sewing machine to direct the sewing machine to stitch together only printed areas of the sheet layers based on factors such as the shape of the 3d object being formed by the respective bundle of the 3D object being sewn together. In examples, the sewing includes repeatedly passing a sewing needle and sewing thread attached to the sewing needle through the bundle of printed substrate layers to pull a first loop of the sewing thread from one side of the bundle to the opposite side of the bundle with a sewing mechanism, repeatedly wrapping the first loop of the sewing thread around a second sewing thread with a looping mechanism, and pulling the sewing needle and attached sewing thread out of the bundle of printed substrate layers. In other examples, the sewing includes repeatedly passing a sewing needle and sewing thread attached to the sewing needle through the bundle of printed substrate layers to pull a first loop of the sewing thread from one side of the bundle to the opposite side of the bundle with a sewing mechanism, repeatedly wrapping the first loop of the sewing thread around a second loop of the sewing thread with a looping mechanism, and pulling the sewing needle and attached sewing thread out of the bundle of printed substrate layers.

Operation of the method shown in FIG. 4 proceeds to Steps S450, where the sewn bundle is transferred to a stacker subsystem by the bundle convey subsystem for subsequent processing, which may include bonding with other sewn bundles to form a stack of printed substrate layers including the sewn bundle. In examples, this step may include placing the sewn bundle onto a previously formed sewn bundle and in alignment therewith with alignment apertures of the bundles in register with registration pins of the stacker subsystem, wherein the stacker subsystem receives the sewn bundles to form an aligned stack of the sewn bundles. Operation may repeat back to Step S610 to increment the stack with additional sewn bundles until the stack is completed. Then the stack is ready for subsequent processing, such as heating, compressing and cleaning as discussed above. During the heating and compression of the bundles, the sewing threads of each bundle may bunch together within each bundle and with adjacent bundles. As the substrate layers are allowed to cool, the threads may fixedly entangle with the cooled polymers of the bundle and adjacent bundles forming the final solid 3D object to further increase the stack strength in the Z-axis perpendicular to the planar direction of the stacked substrate sheets.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to 3D inking system in many different configurations. For example, although single-pass marking material deposition is shown in the discussed embodiments, the examples may apply to multi-pass systems and methods, including 3d object forming systems and methods. Also, while single-side printing is shown in the discussed embodiments, the examples may apply to multi-sided printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method of bonding printed composite layers into bundles during composite based additive manufacturing, comprising:
    a) receiving a plurality of printed substrate layers in succession from an additive manufacturing device, each printed substrate layer having a substrate sheet printed with a polymer;
    b) stacking the received plurality of printed substrate layers in aligned formation at a piling station to form a bundle of the printed substrate layers, the bundle of printed substrate layers being a part of a stack of the printed substrate layers forming a 3D composite object;
    c) sewing the printed substrate layers together with a sewing machine to form a sewn bundle; and
    d) transferring the sewn bundle to a stacker subsystem via a bundle convey subsystem for subsequent bonding with a second sewn bundle to form a stack of printed substrate layers including the sewn bundle.

2. The method of claim 1, wherein the step c) further comprises repeatedly passing a sewing needle and sewing thread attached to the sewing needle through the bundle of printed substrate layers to pull a first loop of the sewing thread from one side of the bundle of printed substrate layers of printed substrate layers to an opposite side of the bundle with a sewing mechanism, repeatedly wrapping the first loop of the sewing thread around a second sewing thread with a looping mechanism, and pulling the sewing needle and attached sewing thread out of the bundle of printed substrate layers.

3. The method of claim 1, wherein the step c) further comprises repeatedly passing a sewing needle and sewing thread attached to the sewing needle through the bundle of printed substrate layers to pull a first loop of the sewing thread from one side of the bundle of printed substrate layers to an opposite side of the bundle of printed substrate layers with a sewing mechanism, repeatedly wrapping the first loop of the sewing thread around a second loop of the sewing thread with a looping mechanism, and pulling the sewing needle and attached sewing thread out of the bundle of printed substrate layers.

4. The method of claim 1, further comprising, after step b), transferring the bundle of printed substrate layers from the piling station to the sewing machine with the bundle convey subsystem.

5. The method of claim 1, wherein the sewing is performed with a thread including one of a polymer fiber and a carbon fiber.

6. The method of claim 1, wherein the step b) includes aligning registration apertures of the printed substrate layers about registration pins at the piling station.

7. The method of claim 1, wherein the step d) includes placing the sewn bundle onto the second sewn bundle and in alignment therewith with alignment apertures of the bundles in register with registration pins of the stacker subsystem, the stacker subsystem receiving the sewn bundles to form a stack of the sewn bundles.

8. The method of claim 1, further comprising, after step d), entangling a sewing thread from the sewn bundle with the polymer printed on a printed substrate layer of an adjacent bundle of printed substrate layers.

9. The method of claim 1, further comprising outputting control signals from a controller to control the sewing machine.

10. A method of bonding printed composite layers into bundles during composite based additive manufacturing, comprising:
    a) receiving a plurality of printed substrate layers in succession from an additive manufacturing device, each printed substrate layer having a substrate sheet printed with a polymer;
    b) stacking the received plurality of printed substrate layers in aligned formation at a piling station to form a bundle of the printed substrate layers, the bundle of printed substrate layers being a part of a stack of the printed substrate layers forming a 3D composite object;
    c) outputting control signals from a controller to control a sewing machine;
    d) sewing the printed substrate layers together with the sewing machine to form a sewn bundle, the sewing further comprising repeatedly passing a sewing needle and sewing thread attached to the sewing needle through the bundle of printed substrate layers to pull a first loop of the sewing thread from one side of the bundle of printed substrate layers to an opposite side of the bundle of printed substrate layers with a sewing mechanism, repeatedly wrapping the first loop of the sewing thread around a second loop of the sewing thread with a looping mechanism, and pulling the sewing needle and attached sewing thread out of the bundle of printed substrate layers; and e) transferring the sewn bundle to a stacker subsystem via a bundle convey subsystem for subsequent bonding with a second sewn bundle to form a stack of printed substrate layers including the sewn bundle, the transferring the sewn bundle including placing the sewn bundle onto the second sewn bundle and in alignment therewith with alignment apertures of the bundles in register with registration pins of the stacker subsystem, the stacker subsystem receiving the sewn bundles to form a stack of the sewn bundles.

11. The method of claim 10, wherein the step b) includes aligning registration apertures of the printed substrate layers about registration pins at the piling station, and further comprising after step b), transferring the bundle of printed substrate layers from the piling station to the sewing machine with the bundle convey subsystem.

* * * * *